United States Patent [19]

Bellanger et al.

[11] Patent Number: 4,907,493
[45] Date of Patent: Mar. 13, 1990

[54] VALVE CONTROL SYSTEM FOR HITCH MOTOR

[75] Inventors: Regis Bellanger, Beauvias, France; William J. Graaskamp, Guelph, Canada

[73] Assignee: Massey-Ferguson Services N. V., Curacao, Netherlands

[21] Appl. No.: 31,819

[22] Filed: Mar. 30, 1987

[30] Foreign Application Priority Data

Apr. 3, 1987 [GB] United Kingdom ............... 8608194

[51] Int. Cl.[4] ............................................. F15B 13/16
[52] U.S. Cl. ....................................... 91/361; 91/364; 91/459; 318/431; 318/599; 172/2
[58] Field of Search ............... 91/275, 361, 459, 364, 91/DIG. 1; 318/430–431, 434, 445, 561, 590, 599, 609, 615, 616; 172/2

[56] References Cited

U.S. PATENT DOCUMENTS

| 2,829,329 | 4/1958 | Silva | 318/561 |
|---|---|---|---|
| 3,458,791 | 7/1969 | Boice | 318/431 X |
| 3,821,625 | 6/1974 | Scholl | 91/361 X |
| 3,874,407 | 4/1975 | Griswold | 91/459 X |
| 4,132,273 | 1/1979 | Mortonson | 172/2 |
| 4,341,986 | 7/1982 | Browder | 318/561 X |
| 4,502,109 | 2/1985 | Delmege et al. | 364/174 |
| 4,540,923 | 9/1985 | Kade et al. | 318/561 |
| 4,546,426 | 10/1985 | Hafner et al. | 318/561 X |
| 4,595,979 | 6/1986 | Arai et al. | 91/361 X |
| 4,612,489 | 9/1986 | Gunda | 318/590 |
| 4,628,499 | 12/1986 | Hammett | 91/361 X |

FOREIGN PATENT DOCUMENTS

| 43725 | 1/1982 | European Pat. Off. . | |
| 98719 | 1/1984 | European Pat. Off. | 91/361 |
| 151323 | 8/1985 | European Pat. Off. . | |
| 186092 | 7/1986 | European Pat. Off. . | |
| 2520155 | 11/1975 | Fed. Rep. of Germany . | |
| 2927585 | 4/1980 | Fed. Rep. of Germany . | |
| 3316305 | 11/1984 | Fed. Rep. of Germany . | |
| 3501568 | 9/1985 | Fed. Rep. of Germany . | |
| 2314529 | 1/1977 | France . | |
| 2503030 | 10/1982 | France . | |
| 180805 | 10/1983 | Japan | 91/275 |
| 2038507 | 7/1980 | United Kingdom . | |

Primary Examiner—Robert E. Garrett
Assistant Examiner—George Kapsalas
Attorney, Agent, or Firm—Robert L. Farris

[57] ABSTRACT

A system for the control of a fluid flow control valve which controls the supply of fluid to an actuator to control the movement of a component such as a tractor implement hitch in response to a selected operating parameter such as hitch position or draft force. The system enables the desired value of the selected parameter to be set and this desired value is compared with the actual sensed value of the parameter to provide a parameter error signal. A start-up control function is provided to improve the initial speed of response of the system. The start-up control function is arranged on each detection of a parameter error signal to apply a start-up signal to the valve to initiate movement of the component and, if no movement results, to increase the start-up signal until movement of the component is detected whereupon the increase in the start-up signal is stopped and the magnitude of the signal applied to the valve is dependent on the parameter error signal so as to tend to reduce the error signal to zero.

9 Claims, 2 Drawing Sheets

VALVE CONTROL SYSTEM FOR HITCH MOTOR

BACKGROUND OF THE INVENTION

1. Field of the Invention

This invention relates to systems for the control of fluid flow control valves which are used to control the supply of fluid to an actuator for the control of the movement of a component. There are many applications for such control systems. For example, the control of a tractor implement hitch, the control of a combine harvester table, the control of a tractor front loader and the control of a tractor backhoe.

2. Description of the Prior Art

Typically the valves used in such control systems include a valve member such as a spool whose position is controlled either directly or indirectly by one or more solenoids in order to adjust the flow of fluid through the valve and hence the movement of the component.

In order to provide an accurate and efficient control function with such a valve much time and attention has been given to the design and development of valves whose through flow rate is predictably proportional to the applied signal. Experience has shown that the provision of such valves is expensive.

SUMMARY OF THE INVENTION

One of the objects of the present invention is to provide a control system for a fluid control valve which enables the movement of a component in response to a selected parameter to be predictably and accurately controlled without the need to use special and thus expensive proportional flow control valves.

This is achieved by providing a control system in which a desired valve of the selected parameter can be set and compared with the actual value of the selected parameter to provide a parameter error signal, and in which a control means supplies a control signal to the valve dependent on the error signal to move the component so as to tend to reduce the error signal to zero. The system also includes a start-up control function which on detection of a parameter error signal applies a start-up signal to the valve to initiate movement of the component and, if no movement results, increases the start-up signal until movement of the component is detected whereupon the increase in the start-up signal is stopped and the magnitude of the signal applied to the valve is dependent on the error signal so as to tend to reduce the error signal to zero.

In one form of the present invention the control means of the system includes a velocity setting function for setting a velocity of movement of the component which is dependent on the parameter error signal and means are also provided for providing a signal representative of the actual velocity of the component. These set and actual velocities are then compared to provide a velocity error signal. The start up control function is arranged on detection of a parameter error signal to apply a start-up signal to the valve so as to initiate movement of the component and, if no actual velocity signal results indicating no movement, to increase the start-up signal until an actual velocity signal is detected whereupon the increase of the start-up signal is stopped and the magnitude of the signal applied to the valve is dependent on the velocity error signal so as to tend to reduce the parameter and velocity error signals to zero.

Preferably on the imposition of the start-up signal the magnitude of the signal necessary to produce an actual velocity signal is stored as a last stored signal used to adjust the level of the subsequent start-up signals.

For example, the start up control function may be arranged to adjust the start-up signal in a predetermined manner if the difference between the last stored signal and the corresponding applied start-up signal is greater than a maximum expected variation in the start-up signal. The system is preferably arranged so that the start-up signal is not adjusted if an actual velocity signal occurs before the end of a desired delay period from the application of the start-up signal.

By applying the above start-up signal to the valve at the start of a correction of the selected parameter, the initial speed of response of the system can be improved. In a preferred arrangement the start-up signal is arranged to be just slightly less than the minimum signal expected to be necessary to cause movement of the component thus significantly reducing unnecessary delay in the build-up of the signal to the level at which the component begins to move. If this start-up value is found insufficient to initiate movement of the component the start-up signal is rapidly increased by the system until detection of an actual velocity signal indicates movement of the component whereupon control of the movement of the component is made dependent on the velocity error signal thus maintaining the quick response of the system.

Also, as indicated above, if the initially applied start-up signal is not sufficient to result in movement of the component, the system is capable of storing the magnitude of the signal which does result in movement of the component to enable the level of subsequent start-up signals to be adjusted thus further improving the response of the system and enabling this good response to be maintained.

The magnitude of the signal which must be applied to a solenoid-operated valve of the kind mentioned above in order to produce movement of any controlled component varies with such factors as the applied battery voltage, the temperature of the solenoid coil, the spring force applied to the valve member, the speed of operation of the associated pump, the level of any pressure in any actuator which is fed by the valve, and manufacturing tolerances in the valve.

The control system in accordance with the present invention is able to take account of all the above variables and to adjust the level of the start-up signal accordingly to ensure rapid and accurate valve response.

The actual velocity of the component may conveniently be provided by sensing the position of the component relative to a datum and then differentiating the position signal with respect to time.

The control means preferably provides the control signal to the valve using the so-called pulse width modulation technique.

If the system is used to control a tractor implement hitch the selected control parameters will normally be the position of the hitch relative to the tractor and/or the draft force imposed on the hitch by the implement but other parameters may be employed such as engine speed or wheel slippage rate. The desired value of the operating parameter may be set manually by the tractor operator or may be set by a tractor performance monitoring device or system.

The present invention also provides a method of controlling a fluid flow control valve which controls the supply of fluid to control the movement of a component in response to a selected parameter. This method also utilizes the principle of applying a start-up signal to the valve on detection of a parameter error signal (as described above) and, if no movement results, increasing the start-up signal until movement of the component is detected. When movement is detected the increasing of the start-up signal is stopped so that the magnitude of the signal applied to the valve is dependent on the error signal so as to tend to reduce the error signal to zero.

BRIEF DESCRIPTION OF THE DRAWINGS

One embodiment of the present invention as applied to the control of a tractor implement hitch will now be described, by way of example only, reference to the accompanying drawings in which.

DETAILED DESCRIPTION OF THE PREFERRED EMBODIMENTS

Figure 1:
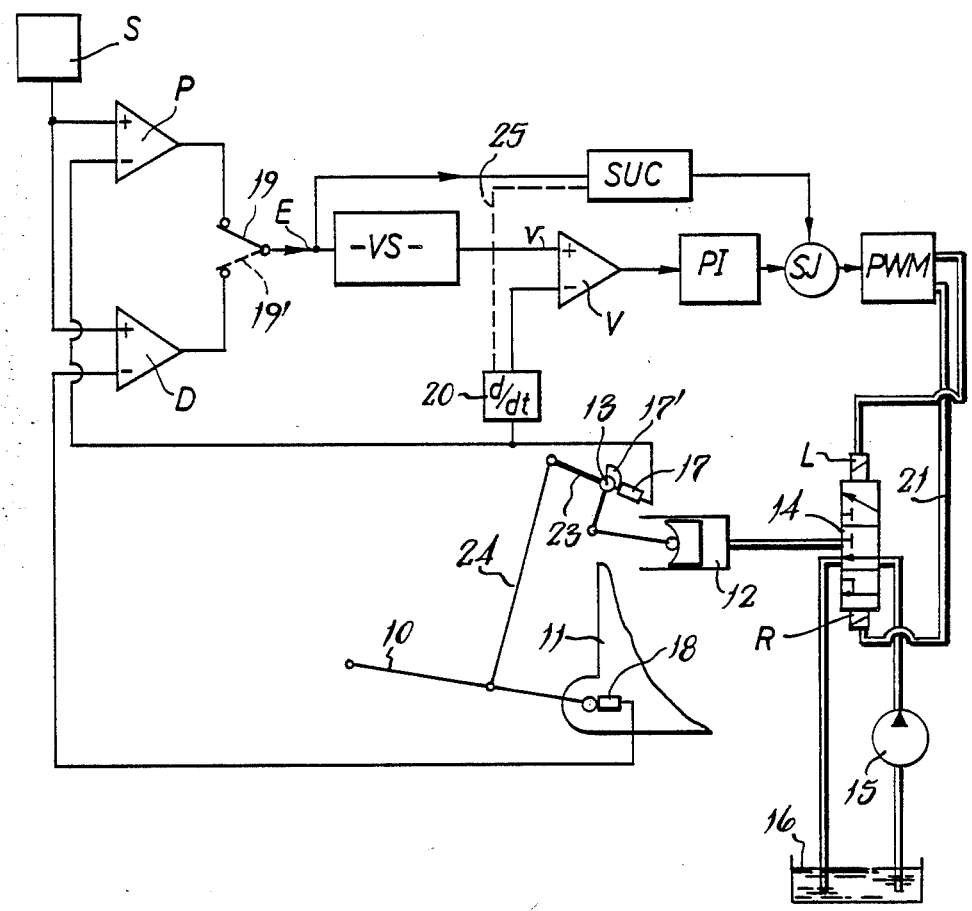
FIG. 1 is a diagrammatic representation of a control system embodying the present invention and the associated hydraulic valve components necessary to control a tractor implement hitch.

Referring to FIG. 1 the tractor hitch comprises a pair of draft links 10 (only one of which is shown in FIG. 1) and a top link (not shown) which are pivotted on to the rear of a tractor main housing 11. The position of the draft links 10 relative to the housing 11 is controlled by a hydraulic ram 12 which is connected with the draft links 10 via a conventional rotatable cross-shaft 13 which carries a pair of lift arms 23 and lift rods 24.

The control system is designed to control the rotational movement of the cross-shaft 13 thus controlling the position of the associated draft links 10.

The control of the supply of pressurised hydraulic fluid to the ram 12 and the venting of hydraulic fluid from the ram is effected by a solenoid operated spool valve 14 which is supplied with pressurised fluid by a pump 15 and which vents fluid to reservoir 16.

In the system shown in FIG. 1 the movement of the cross-shaft 13 and hence the draft links 10 is arranged to be controlled in accordance with values of the parameters of "hitch position" and "draft force" imposed on the hitch. The desired value of hitch position or draft force is set by the operator using the setting means S which may conveniently comprise a rotary or linear potentiometer. This set value is fed to one input of a hitch position comparator P and a draft force comparator D. The other input of position comparator P is fed with the actual position of the cross-shaft 13 using a position sensor 17 which contacts a cam 17' which rotates with shaft 13. The other input of the draft force comparator D is fed with the actual draft force imposed on the draft links 10 by the implement from a draft force sensor 18. It will be appreciated that the position sensors 17 and draft force sensor 18 may be of any suitable type which is capable of providing an electrical signal proportional to either hitch position or draft force and may be arranged to act on any component which either moves with the hitch or is subjected to draft force.

When the control system is to operate in accordance with the hitch position parameter, switch 19 is set in the full line position shown in FIG. 1 and the position error emerging from position comparator P is fed to the remainder of the control system. Similarly when the control system is to operate in accordance with the draft force parameter the switch is moved to the dotted line position 19' thus connecting the draft force error signal leaving comparator D to the remainder of the control system.

Figure 2:
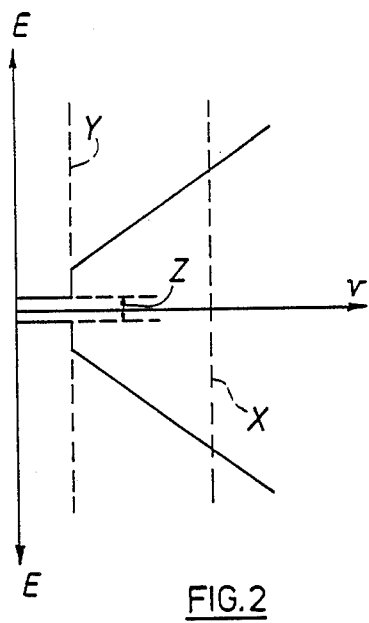
FIG. 2 is a curve showing the variation of the set velocity with the control parameter.

The output from comparator P or comparator D is fed to a velocity setting function VS which sets in effect a rotational velocity v for the cross-shaft 13 which is dependent on the magnitude of the position or draft force error E in accordance with the curve shown in FIG. 2. Thus the larger the error the greater the set velocity within maximum and minimum velocity values shown, for example by lines X and Y in FIG. 2. Typically the maximum and minimum velocity values X and Y are say 43 cm/sec and 5 cm/sec respectively. As can be seen from FIG. 2 the error signal has a deadband Z within which no corrective action is taken.

The output of the velocity setting function VS is fed to one input of a velocity comparator V. The other input of comparator V receives signals from a differentiator 20 which differentiates the position signal from sensor 17 with respect to time to provide a signal proportional to the actual velocity of cross-shaft 13. The output of comparator V is processed by a proportional-/integral control designated PI in FIG. 1 and this processed signal is then fed to a pulse width modulation unit designated PWM in FIG. 1 via a summing junction SJ. This PWM unit, dependent on the value and sign of the signal from comparator V and PI control, then issues signals via line 21 to oscillate a "raise" solenoid R of valve 14 in order to supply pressurised fluid to ram 12 and thus raise the draft links 10 or may supply signals via line 22 to oscillate a "lower" solenoid L of valve 14 thus connecting the ram 12 to reservoir 16 and thus allowing the draft links 10 to lower under gravity. If there is no error signal emanating from comparator V then the PWM modulating unit will not issue signals via line 21 nor via line 22 and the valve 14 will be locked in its central neutral position, as shown in FIG. 1, thus locking the draft links 10 in their current position.

Thus with the tractor implement control system described above, the operator can, for example, set the switch 19 in the figure shown in FIG. 1 and thus opt to control the position of the draft links 10 in accordance with the desired position set on the setting means S. When operating in this so-called "position control" mode the position error signal via switch 19 to the velocity setting function VS. As indicated above, the larger the position error the higher will be the velocity v set by unit VS. Velocity comparator V provides a velocity error signal by comparing the set velocity from unit VS with the actual cross-shaft velocity from differentiator 20. This velocity error signal is processed in the PI control unit and an appropriate raise or lower signal is transmitted to the appropriate solenoid of valve 14 so as to tend to reduce both the velocity and the position errors to zero. Once the position error from comparator P is within deadband Z no further corrective action is applied by the PWM unit and the valve 14 is thus held locked in its neutral position until the next position error is detected whereupon the process is repeated.

It will be appreciated that the control system can operate in the so-called "draft control" mode by moving the switch to position 19'. The system operates in exactly the same manner as described above except that the velocity setting function VS sets velocities dependent on the draft-force error from comparatort D and no further corrective action is applied once the draft force error signal is within deadband Z.

Whilst the above system does function, as indicated above, such a system will not be ideal in response characteristics due to the somewhat unpredictable nature of the response of solenoid valves to a given magnitude of control signal.

To mitigate the above problems the system is provided with a start-up control function designated SUC in FIG. 1 which receives the error signal from either the position comparator P or the draft comparator D and provides signals to the PWM unit via summing junction SJ as will be described below.

Figure 3:
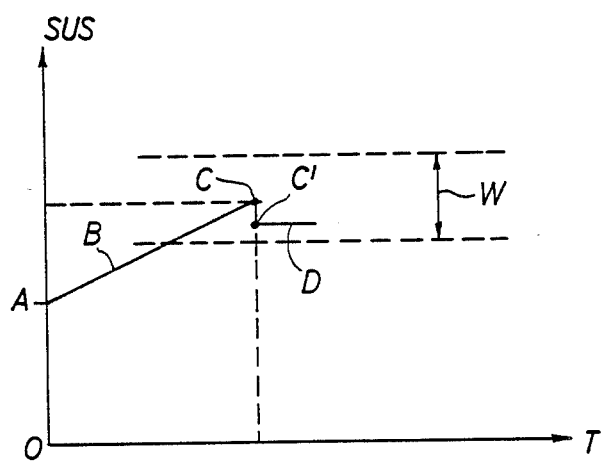
FIG. 3 is a curve showing the build up with time of the start-up signal applied by the control system.

If the system is operating in position control mode, as shown by the position of switch 19 in FIG. 1, each time the system detects the presence of a position error from comparator P outside the deadband Z the start-up control unit issues a signal to the PWM unit to send a start-up signal SUS [represented at AO in FIG. 3 which shows a typical variation of SUS with time (T)] to operate either the raise or lower solenoid of valve 14 dependent on the sign of the position error signal.

The magnitude of signal AO (which represents a given PWM value) is arranged to be just slightly less than expected to be necessary to produce movement of cross-shaft 13 (this minimum signal level is easily deetermined by the system designer when testing prototype systems). If as a result of applying the start-up signal AO no velocity signal is obtained from differentiator 20 (indicating that the cross-shaft 13 has not moved) the magnitude of the start-up signal is increased (in the example described in a linear manner using fast integration as shown by portion B of FIG. 3) until a signal is obtained from differentiator 20 (see point C in FIG. 3) thus indicating that the cross-shaft 13 has begun to move. Typically point C occurs at say 0.150 ms whilst the PWM frequency is say 60 HZ or a period of 16 ms.

The emergence of the velocity signal from the comparator V is arranged to switch out the start-up control function so that control of the further movement of cross-shaft 13 is dependent solely on the velocity error signals from comparator V which are processed by the PI control system as indicated by portion D of FIG. 3. This switching out of the SUC unit is shown diagrammatically in FIG. 1 by dotted line 25 connecting the differentiator 20 and the SUC unit.

There is always a tendency for the movement of the spool of valve 14 to lag behind the signal applied to the valve by the PWM unit. Thus when movement of cross-shaft 13 is detected at point C in FIG. 3, the actual amount of valve spool movement which will have taken place will be fractionally less than that which should occur due to the application of a signal of value CO. Thus after the switching out of the SUC function, when the control of the system is dependent solely on the PI control, the PWM unit is arranged to take over control at a datum signal level C'O (see portion D of FIG. 3) which is slightly lower than signal CO. This datum signal level D is held in the SUC function during the correction of a given position error and used as the datum relative to which the PWM unit operates during the correction of that particular position error.

As will be appreciated, the initial application of the start-up signal AO to the appropriate solenoid of valve 14 significantly increases the speed of response of the control system to the appearance on each position error signal since the rate of increasing the valve control signal is greater than that which can be obtained from PI control alone.

The performance of the system is still further improved by arranging the start-up control function to store the magnitude of the start-up signal necessary to produce an actual velocity signal from comparator 20 at the commencement of each correction of a position error. This stored value of start-up signal may then be used to adjust the level of subsequently applied start-up signals in subsequent position error corrections.

For example, referring to FIG. 3, if the system applies a start-up signal AO to the valve and no movement of the cross-shaft 13 is detected until the start-up signal has risen to the value CO as described above, the start-up control unit will store the signal magnitude CO and can be arranged to adjust the initial start-up signal AO by an appropriate number of predetermined increments if the difference between the actual signal CO and the initially applied signal AO is greater than the maximum expected variation in the start-up signal. This variation is designated W in FIG. 3 and is easily determined by the designer of a specific system during testing of prototype systems. It will be appreciated that the start-up signal AO may be either increased or decreased in the above manner depending on whether the actual magnitude of the signal necessary to produce movement of the cross-shaft 13 is greater than or less than the initially applied start-up signal AO.

Further controls may be applied by the start-up control unit. For example, if movement of the cross-shaft 13 occurs before a minimum specified delay the system may be configured to insure that no adjustment of the start-up value AO is made. This protects against detection of false start-up values caused by movements of the hitch as a result of external disturbances such as striking submerged rocks or other objects.

As will be appreciated the system operates in draft control mode when the switch 19 is in position 19'. With the switch in this position operation of the system is the same as in the position control mode except that the velocity setting function VS sets velocities for cross-shaft 13 dependent on the draft force error from comparator D.

It will be appreciated that the control system of the present invention is particularly suitable for execution using one or more microprocessors and that the diagrammatic flowchart type depiction of the invention has been used to simplify the basic explanation of the principles of operation of the control system.

We claim:

1. A system for the control of a fluid flow control valve which controls the supply of fluid to an actuator to control the movement of a component in response to a selected parameter, the system comprising:

means for setting a desired value of the selected parameter, means for sensing the actual value of the selected parameter, first comparator means for comparing the desired and actual values of the selected parameter to provide a parameter error signal, control means for supplying a control signal to the valve dependent on the error signal to move the component so as to tend to reduce the error signal to zero, means for providing a signal indicating that the component has begun to move in response to the imposition of a given valve control signal, and a start-up control function which on detection of a parameter error signal applies a start-up signal to the valve to initiate movement of the component and, if no movement results, increases the start-up signal until movement of the component is detected whereupon the increase in the start-up signal is stopped and the magnitude of the signal applied to the valve is dependent on the error signal so as to tend to reduce the error signal to zero.

2. A system according to claim 1 in which the control means includes a velocity setting function for setting a velocity of movement of the component which is dependent on the parameter error signal, means for providing a signal representative of the actual velocity of the component, and second comparator means for comparing the set and actual velocities to provide a velocity error signal, the start-up control function being arranged on detection of a parameter error signal to apply a start-up signal to the valve so as to initiate movement of the component and, if no actual velocity signal results indicating no movement, to increase the start-up signal until an actual velocity signal is detected whereupon the increase of the start-up signal is stopped and the magnitude of the signal applied to the valve is dependent on the velocity error signal so as to tend to reduce the parameter and velocity error signals to zero.

3. A system according to claim 1 in which on the imposition of the start-up signal the magnitude of the signal necessary to produce movement of the component is stored as a last stored signal and used to adjust the level of subsequent start-up signals.

4. A system according to claim 3 in which the start-up control function adjusts the start-up signal in a predetermined manner if the difference between the last stored signal and the corresponding applied start-up signal is greater than a maximum expected variation in the start-up signal.

5. A system according to claim 1 in which the start-up signal is not adjusted if movement of the component is detected before the end of a desired delay period from the application of the start-up signal.

6. A system according to claim 1 in which the start-up signal is slightly less than the minimum signal expected to be necessary to cause movement of the component.

7. A control system according to claim 1 in which the control means provides the control signal to the valve using a pulse width modulation technique.

8. A control system according to claim 1 in which the fluid flow control valve controls the position of an implement hitch relative to a tractor.

9. A method of controlling a fluid flow control valve which controls the supply of fluid to control the movement of a component in response to a selected parameter, said method comprising:
setting a desired value of the selected parameter,
sensing the actual value of the selected parameter,
comparing the desired and actual values of the selected parameter to provide a parameter error signal,
supplying a control signal to the valve dependent on the error signal to move the component so as to tend to reduce the error signal to zero,
applying a start-up signal to the valve on detection of a parameter error signal to initiate movement of the component,
detecting if any movement results, and if no movement results increasing the start-up signal until movement of the component is detected, and
upon detection of movement stopping the increasing of the start-up signal so that the magnitude of the signal applied to the valve is dependent on the error signal so as to tend to reduce the error signal to zero.

* * * * *